United States Patent Office 3,348,597
Patented Oct. 24, 1967

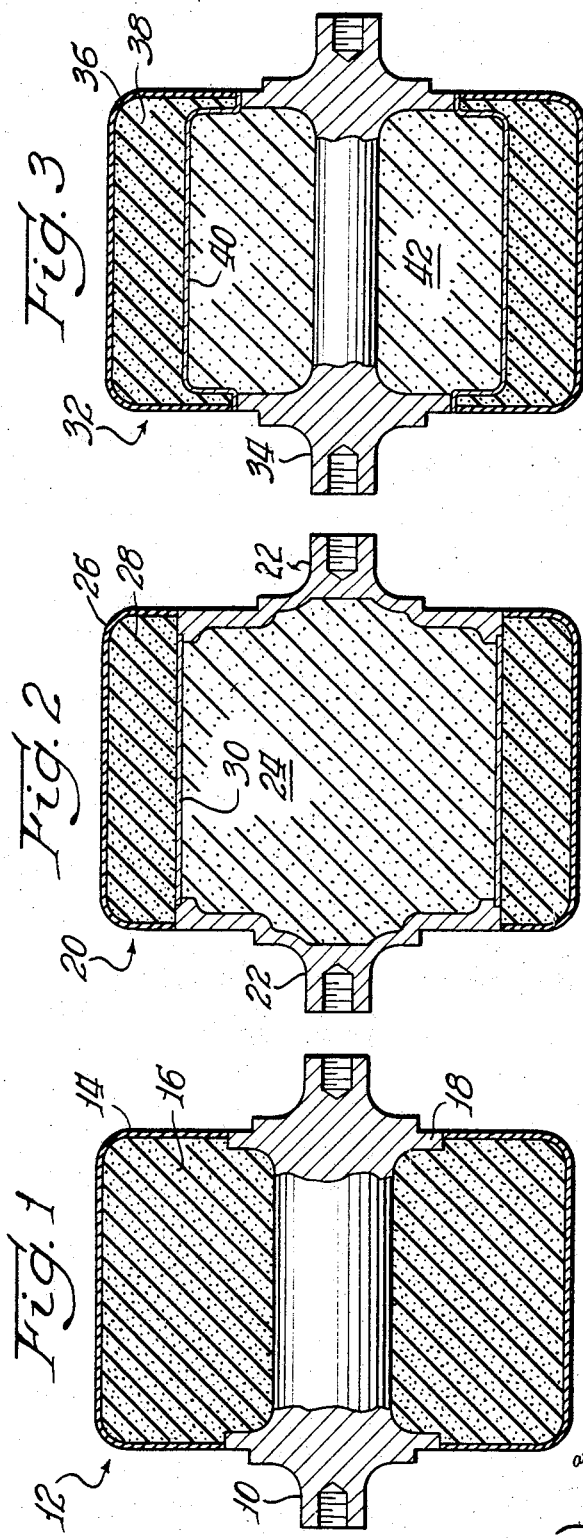

3,348,597
VEHICLE TIRE
Eugene P. Goldberg, Highland Park, Ill., and Carl V. von Linsowe, Portland, Oreg., assignors to Borg-Warner Corporation, a corporation of Illinois
Filed June 17, 1965, Ser. No. 464,774
1 Claim. (Cl. 152—323)

This invention relates to a vehicle tire and more particularly to a non-pneumatic polyurethane tire containing polyurethane foamed rubber, which is especially useful for low-speed amphibious vehicles to provide locomotion on land and flotation in water.

Prior to this invention, there were a great many attempts to provide a puncture-proof tire by adding foamed rubber to a tire casing. These efforts have not met with any marked success due to the necessity of adding at least some air for internal support as well as the inherent problems of heat build-up. Polyurethane elastomers have been utilized for the tire carcass; however, polyurethane foam interior and polyurethane exterior carcass have not, prior to this invention, been satisfactorily combined to provide a tire to take the place of a low pressure pneumatic tire.

In the present invention, it was found that a vehicle tire could be constructed to take the place of the present low-pressure pneumatic tires. This tire provides vehicle support and ride cushioning as well as a density sufficiently low to provide flotation for amphibious vehicles. Further, the tire of this invention is more economical as well as lighter in weight than the conventional pneumatic tire.

The present invention is comprised of a tire that is formed of a highly flexible polyurethane exterior skin or carcass having a good abrasion resistance, combined with a low density polyurethane foam interior which has an appreciable closed-cell structure. The foam density ranges from about 5 to about 1 pound per cubic foot. In alternate embodiments, the density of the interior foam may be from about 1 to 3 pounds per cubic foot for a portion and about 3 to 5 pounds per cubic foot for the remaining portion. The tire of this invention having a foam rubber interior is capable of supporting a load on a vehicle which is comparable to that supported by a low-pressure pneumatic tire, yet is more resilient than the pneumatic tire. Additionally, the tire is pucture-proof by virtue of its cellular foam interior, i.e., a bullet may pass completely through the tire without causing any substantial decrease in supporting capability.

The polyurethane elastomers generally employed in the manufacture of the foam as well as the skin of the tire hereinafter described are ordinarily prepared by the reaction of a polyester, a polyether glycol, or a polyester amide with a polyisocyanate, especially a diisocyanate of the benzene series. Other reactive materials such as catalysts, cross-linking agents, water and polyhydric alcohols are employed, as are fillers, surfactants and other additives. The outer skin is preferably vulcanized polyurethane which has a high tensile strength, is exceedingly resistant to abrasion, and is resistant to greases and oils.

The polyester urethanes utilized in this invention are those high molecular weight products which result when linear polyesters, containing reacting terminal hydroxyl groups, are reacted with diisocyanates. Exemplary polyesters are those found by the esterification-condensation of a dicarboxylic acid or its anhydride with an excess of glycol.

The polyesters which have utility in this invention are formed by the esterification-condensation of at least one dicarboxylic acid or its anhydride having the structure

HOOC—R—COOH wherein R represents a divalent hydrocarbon radical having from 1 to 12 carbon atoms reacted with a glycol. Representative acids include malonic, succinic, glutaric, adipic, pimelic, sebacic, suberic, azelaic, maleic, itaconic, phthalic, terephthalic, isophthalic, etc.

The glycols reacted with dicarboxylic acids in accordance with this invention are generally representative of the structure

HO—R'—OH wherein R' is a divalent hydrocarbon radical having from 2 to 12 carbon atoms. Such glycols include ethylene glycol, propylene glycol, trimethylene glycol, tetramethylene glycol, butene, diol, butene diol, pentamethylene glycol, hexamethylene glycol, cyclohexylene glycol, heptamethylene glycol, and the like.

The polyether glycols useful in this invention are those which are derived from alkylene oxides, glycols, or from heterocyclic ethers and they may be represented by the formula HO(R''O)$_n$H in which R'' is an alkylene radical having from 2 to 12 carbon atoms and $n$ is greater than one. As in the polyesters, it is not necessary that all the alkylene radicals be the same and polyether glycols containing a mixture of radicals may be employed. The polyarylene glycols in which R'' is an arylene radical and polyarylene-alkylene ether glycols such as polyethylene-phenylene ether glycol or mixtures thereof with polyalkylene ether glycols are also useful.

The molecular weight of the polyester glycols, polyester amides, and polyether glycols of this invention can vary from 150 to 10,000 with the preferred range being between about 400 and about 4,000. The acid number of the polyester glycols and polyester amides are generally less than 10 and preferably less than 4.

The polyisocyanates which are most useful for producing polyether and polyester urethanes and polyester amide urethanes embodied in this invention are those which conform to the structure

OCN—R'''—NCO wherein R''' is a divalent hydrocarbon radical having from 2 to 14 carbon atoms. The preferred diisocyanates of this invention are the aromatic diisocyanates such as tolylene, 2,4-diisocyanate, ortho-, meta-, and para-phenylene diisocyanates, napthalene-1,5-diisocyanate, diphenylmethane-p-p'-diisocyanate, and mixtures thereof.

In making the polyurethane foam utilized in the tire of this invention, it is generally accepted that there be an excess of diisocyanate (in molds) over the dihydroxy polyether or polyester so that the resulting polyurethane will be isocyanate-terminated. In this manner, the polyurethane can be chain extended with amines, hydrazines, water or other compounds having at least two hydrogen atoms capable of reacting with isocyanate groups and having a molecular weight of less than 500.

By varying the amounts of polyether, polyester, or diisocyanate, as well as the chain extender, the degree of cross-linking and density of the foam can be varied over an extremely wide range. It is desirable to provide a relatively low density, i.e., between about 1 pound per cubic foot and 5 pounds per cubic foot as above-mentioned.

To provide a vehicle tire of this invention, a mold is provided to receive the polyurethane material in the desired configuration of the tire. A typical formulation which is provided to produce a suitable semi-rigid foam with an appreciable amount of closed-cell structure may be as follows: prepolymer is formulated and designated as component A. The prepolymer is formulated by blending 100 parts by weight of a polypropylene triol with 0.02 to 0.09 part by weight of dibutyl tin dilaurate.

parts by weight of tolylene diisocyanate (acidity 0.012–0.016) are added and the mixture is heated for approximately 10 minutes during which there is an exothermic reaction. The mixture is cooled to room temperature.

A second component designated component B is formulated by blending 40 parts by weight of the polypropylene triol with 10 parts by weight of a hydroxyl terminated tetrafunctional polyoxypropylene substituted ethylene diamine, 1.2 parts by weight water, 1.2 parts by weight dihydroxypropyl-2-methyl piperazine, 0.5 part by weight of surfactant and catalyst (Fomrez, 1058, Witco Co.).

The ingredients of component B are thoroughly mixed and 30 parts by weight of finely divided coated calcium carbonate (Wyandotte Pluracol SC) is added thereto under agitation. After mixing component B with the calcium carbonate, the mixture is allowed to stand approximately two hours until there is a complete wetting of the calcium carbonate. Six parts by weight of Freon$_{11}$ trichlorofluoromethane is added and the container is closed to prevent evaporation of Freon.

Components A and B are added to a mixing machine at the rate of about 22 pounds per minute. The mixture is continuously flowed into the mold and the mold has a fill time of about 70 seconds with a rise time of about 5 minutes per foot. The mold is cured at about 180° F. for approximately four hours. The resulting tire has a density of about 5 pounds per cubic foot with a significant amount of closed-cell structure.

The advantages of this invention will become apparent to those skilled in the art upon consideration of the specification, appended claim, and attached drawings, wherein:

FIGURE 1 is a cross-sectional view of a tire of this invention;

FIGURE 2 is a cross-sectional view of an alternate embodiment of this invention; and FIGURE 3 is a cross-sectional view of a third embodiment of this invention.

Referring now more particularly to the drawings, FIGURE 1 shows a cross-sectional view of a non-pneumatic tire generally depicted as 12 that is mounted on an axle 10 which is adapted to be axially attached to an endless roller such as utilized on an amphibious vehicle or the like. The tire 12 is comprised of an outer shell or casing 14 of polyurethane rubber which encloses closed-cell polyurethane foam 16 prepared as set forth above. The cellular structure of the interior of the tire 12 has a density of from about one to about five pounds per cubic foot. The cellular structure allows a projectile or sharp object to enter the casing and puncture those cells in its path without materially affecting those cells adjacent or contiguous to the hole made by the foreign object. Thus, there is no loss of the supportive qualities or capabilities in the tire through puncture.

The tire 12 is constructed by inserting axle 10 into a tire mold and thereafter pouring in the polyurethane mixture as above described. As the mixture is poured into the mold, a skin forms adjacent the mold wall and serves as the tire casing. When the polyurethane has set, the tire is removed from the mold and is ready for mounting on a vehicle. The axle 10 is provided with a hub 18, which hub retains the tire in a centered position on axle 10.

FIGURE 2 shows an alternate embodiment of the invention. As shown, tire 20 is comprised of hubs 22 joined by a semi-rigid cylindrical sheet 30 of plastic or metal, which hubs and cylinder enclose a cylindrical chamber 24.

Chamber 24 is filled by means of a hole in hub 22 (not shown), with low density polyurethane foam (from about 1 pound to about 3 pounds per cubic foot). The partially constructed tire, similar to axle 10 of FIGURE 1, is then placed in a mold and a polyurethane mixture, as described with respect to FIGURE 1, is poured around the partially constructed tire. This outer tire portion is comprised of a polyurethane skin or outer casing 26 enclosing polyurethane foam within cylindrical chamber 28. Foam in chamber 28 is of a density higher than foam in chamber 24, i.e., closer to five pounds per cubic foot. The tire is thus comprised of an outer skin with two concentric cylindrical foam layers within, each layer being of a different density cellular foam.

FIGURE 3 combines features from both FIGURES 1 and 2. Tire 32 is comprised of a central axle 34 which is provided with integral hubs 34'. Tire 32 also has a semi-rigid cylindrical member 40 surrounding low density foam (i.e., 1 to 3 pounds per cubic foot) within a chamber 42. Chamber 42 is filled as is chamber 24 of FIGURE 2. The outer skin 36 and chamber 38 are also provided in the manner that is described with relation to FIGURE 2. The foam within chamber 38 is also of a higher density than the foam within chamber 42, i.e., from 3 to 5 pounds per cubic foot.

From the foregoing description, it will be noted that the polyurethane foam herein described is directed to tire structures for amphibious vehicles, such as an "air-roll" vehicle, that require buoyancy as well as the ability to move over rough land terrain. An "air-roll" vehicle is one that is provided with tires or supporting members on a continuous belt or track similar to that of an Army tank. It will be understood that the tires of this invention may also be utilized for earth moving vehicles, tractors, moon vehicles and other vehicles as well. The invention is especially adapted for use on vehicles wherein the tire necessitates a tough puncture resistant outer surface with a resilient buoyant inner core.

While certain embodiments and details have been represented for the purpose of illustrating the invention, it will be apparent to those skilled in the art that various changes and modifications may be made without departing from the spirit and scope of the invention set forth in the following claim.

What is claimed is:

A generally cylindrical, puncture-proof vehicle tire for an amphibious vehicle comprised of a polyurethane rubber casing and a polyurethane foam interior, said foam interior consisting of concentric inner and outer cellular foam layers, said inner foam layer having a density of between one and three pounds per cubic foot and said outer cellular foam layer having a density of from three to five pounds per cubic foot, said inner and outer foam layers being separated from each other by a cylindrical sheet of plastic or metal.

References Cited

UNITED STATES PATENTS 3,022,810   2/1962   Lambe _____ 152—313 X

FOREIGN PATENTS 884,139   12/1961   Great Britain.

ARTHUR L. LA POINT, *Primary Examiner.*

C. W. HAEFELE, Y. P. SCHAEVITZ,
*Assistant Examiners.*